3,822,211
FISHERMAN'S SOAP
La Verne N. Morton, Paton, Iowa, assignor to
American Leisure Products, Inc.
No Drawing. Filed Apr. 10, 1972, Ser. No. 242,816
Int. Cl. A01k 85/00; C11d 7/44, 9/38
U.S. Cl. 252—132     3 Claims

ABSTRACT OF THE DISCLOSURE

A fisherman's soap composition is described herein consisting essentially of soap, anise oil, mulberry juice and cinnamon. The ingredients are present in the relative proportions of 100 pounds of soap, 4 to 8 ounces of anise oil, 3 to 6 ounces of mulberry juice and 1 to 5 ounces of cinnamon. The soap may be used by a fisherman to wash bait for preventing excessive human scent from remaining on the bait and for providing the bait with sufficient anise oil and cinnamon to substantially help in attracting fish to the bait. The fisherman may also use the soap to wash his hands to prevent human scent from being applied to the bait.

---

It is common knowledge that fish are repelled by bait having human scent thereon. Heretofore, practically all fish lures were put into the water with human scent thereon. The same is true for practically all types of live and imitation bait since the live and imitation bait must be handled prior to the bait being placed in the water.

Therefore, it is a principal object of this invention to provide a fisherman's soap.

A further object of this invention is to provide an improved fisherman's soap comprising soap, anise oil, mulberry juice and cinnamon.

A further object of this invention is to provide a fisherman's soap which may be manufactured in either bar or aerosol form.

A further object of this invention is to provide a fisherman's soap which may be used to wash bait to remove human scent therefrom.

A further object of this invention is to provide a fisherman's soap having attractant characteristics.

A further object of this invention is to provide a fisherman's soap composition which is convenient to use.

One embodiment of this invention consists essentially of soap, anise oil, mulberry juice and cinnamon in the relative proportions of 100 pounds of soap, 4 to 8 ounces of anise oil, 3 to 6 ounces of mulberry juice and 1 to 5 ounces of cinnamon. The above permissible relative proportions provide a fisherman's soap composition having the desired characteristics. However, the preferred relative proportions of ingredients are 100 pounds of soap, 6 ounces of anise oil, 4 ounces of mulberry juice and 2 ounces of cinnamon.

Preferably, the soap should be comprised of a non-polluting, biodegradable soap base of the anhydrous type. A satisfactory soap composition is an anhydrous soap base comprising 85% anhydrous animal fat and tallow, 12% water, 1.25% glycerine and traces of magnesium silicate, sodium chloride and free alkali. The anhydrous animal fat and tallow preferably has 15% coconut oil therein.

The anise oil is a readily available shelf item. The mulberry juice is preferably comprised of an essence of mulberry juice in the liquid concentrate form. The cinnamon is preferably in liquid cinnamon oil form.

The soap composition of this invention is made in bar form by simply mixing the soap base (liquid form), anise oil, essence of mulberry juice and cinnamon oil. The mixture is then molded into bar form in conventional fashion. If desired, the mixed ingredients may be in conventional aerosol cans. Additionally, the ingredients may also be used in liquid form. However, the preferred embodiment is the bar form.

The finished product in bar form is conveniently used by the fisherman. It is recommended that the fisherman wash his hands with the fisherman's soap prior to handling any of the bait or lures. The bait or lures should then be washed with the fisherman's soap to remove any human scent thereon. The soap not only removes the human scent from the bait or lures but also adds fish attractants thereto. The anise oil, esence of mulberry juice and cinnamon oil add sufficient attractant characteristics to the bait or lures so as to attract fish. The aerosol and liquid forms of the soap are used in similar fashion to that just described.

Thus it can be seen that an improved fisherman's soap has been provided which permits the fisherman to remove all traces of human scent from the bait or lures. It can also be seen that an improved fisherman's soap composition has been provided which permits the fisherman to wash the bait or lures so as to add fish attractant characteristics thereto.

I claim:
1. A fisherman's soap composition consisting essentially of soap, anise oil, mulberry juice and cinnamon, wherein said ingredients are present in the relative proportions of 100 pounds of soap, 4 to 8 ounces of anise oil, 3 to 6 ounces of mulberry juice, and 1 to 5 ounces of cinnamon.
2. The fisherman's soap composition of claim 1 wherein said soap is comprised of an anhydrous soap base.
3. The fisherman's soap composition of claim 1 wherein said cinnamon comprises cinnamon oil.

References Cited
UNITED STATES PATENTS
3,666,669   5/1972   Noordam _____ 252—132

LEON D. ROSDOL, Primary Examiner
D. L. ALBRECHT, Assistant Examiner

U.S. Cl. X.R.
43—42.06; 99—3; 252—108; 260—236.5, 236.6; 424—84